(12) United States Patent
Mochizuki et al.

(10) Patent No.: US 11,465,553 B2
(45) Date of Patent: Oct. 11, 2022

(54) ILLUMINATING LAMP FOR VEHICLE

(71) Applicant: KOITO MANUFACTURING CO., LTD., Tokyo (JP)

(72) Inventors: Kiyotaka Mochizuki, Shizuoka (JP); Naoki Tatara, Shizuoka (JP); Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/278,582

(22) PCT Filed: Sep. 26, 2019

(86) PCT No.: PCT/JP2019/037955
§ 371 (c)(1),
(2) Date: Mar. 22, 2021

(87) PCT Pub. No.: WO2020/067337
PCT Pub. Date: Apr. 2, 2020

(65) Prior Publication Data
US 2021/0347294 A1 Nov. 11, 2021

(30) Foreign Application Priority Data
Sep. 28, 2018 (JP) .............................. JP2018-185880

(51) Int. Cl.
*B60Q 1/26* (2006.01)
*F21S 41/33* (2018.01)
(Continued)

(52) U.S. Cl.
CPC .............. *B60Q 1/26* (2013.01); *F21S 41/148* (2018.01); *F21S 41/27* (2018.01); *F21S 41/33* (2018.01); *F21S 41/675* (2018.01); *F21S 41/28* (2018.01)

(58) Field of Classification Search
CPC .......... F21S 41/27; F21S 41/33; F21S 41/148; F21S 41/675; B60Q 1/26
See application file for complete search history.

(56) References Cited

U.S. PATENT DOCUMENTS

| 9,616,750 B2 | 4/2017 | Shibata et al. |
| 9,904,375 B1* | 2/2018 | Donnelly ................. G05D 1/00 |

(Continued)

FOREIGN PATENT DOCUMENTS

| DE | 102016122043 A1 | 6/2017 |
| DE | 102016124933 A1 | 7/2018 |

(Continued)

OTHER PUBLICATIONS

International Search Report issued in International Application No. PCT/JP2019/037955, dated Nov. 19, 2019 (3 pages).

(Continued)

*Primary Examiner* — Thomas M Sember
(74) *Attorney, Agent, or Firm* — Osha Bergman Watanabe & Burton LLP

(57) ABSTRACT

When a pedestrian who is crossing a road or is about to cross a road is detected and it is determined that there is a risk of the own vehicle coming into contact with the pedestrian, a figure rendering forming optical unit provided in a housing of a head lamp emits a spot of light having a predetermined width and a predetermined length to a road surface ahead in a crossing direction including the pedestrian or the like. Accordingly, the pedestrian or the like knows the presence of an approaching vehicle and a driver knows the presence of the pedestrian or the like who is crossing a road or is about to cross a road.

6 Claims, 13 Drawing Sheets

(51) Int. Cl.
*F21S 41/675* (2018.01)
*F21S 41/27* (2018.01)
*F21S 41/148* (2018.01)
*F21S 41/20* (2018.01)

(56) References Cited

U.S. PATENT DOCUMENTS

| | | | |
|---|---|---|---|
| 2014/0062685 A1 | 3/2014 | Tamatsu et al. | |
| 2016/0039286 A1* | 2/2016 | Shibata | B60K 35/00 701/36 |
| 2017/0262715 A1 | 9/2017 | Kozuka et al. | |
| 2018/0099604 A1 | 4/2018 | Mouri et al. | |
| 2019/0156130 A1 | 5/2019 | Kozuka et al. | |

FOREIGN PATENT DOCUMENTS

| | | |
|---|---|---|
| EP | 3210825 A1 | 8/2017 |
| FR | 3050700 A1 | 11/2017 |
| JP | 2004-331021 A | 11/2004 |
| JP | 2005161977 A | 6/2005 |
| JP | 2014046838 A | 3/2014 |
| JP | 2015143093 A | 8/2015 |
| JP | 2016037260 A | 3/2016 |
| JP | 2017159881 A | 9/2017 |
| JP | 2018058542 A | 4/2018 |

OTHER PUBLICATIONS

Written Opinion issued in International Application No. PCT/JP2019/037955, dated Nov. 19, 2019 (5 pages).
Extended European Search Report issued in corresponding European application No. 19864192.0, dated Oct. 14, 2021 (10 pages).
DrikingSpiritUK: "Audi Matrix Laser Headlights—Future Technology", Youtube, Feb. 18, 2015. Retrieved from https://www.youtube.com/watch?v=HtitwsV4fAE, from 0:00 to 1:00. (7 pages).

* cited by examiner

ILLUMINATING LAMP FOR VEHICLE

TECHNICAL FIELD

The present disclosure relates to an illuminating lamp for a vehicle that calls attention of a pedestrian or the like who is crossing a road or is about to cross a road by emitting light.

BACKGROUND ART

Patent Literature 1 discloses a vehicular travel supporting device that calls attention of a driver of the own vehicle or another vehicle, a pedestrian, or the like. According to this device, a sensor detects the presence of a pedestrian, a bicycle (hereinafter, refers to as a pedestrian or the like), or the like that is crossing a road or is about to cross a road from now on, and the device predicts and detects a position where a traveling trajectory of the own vehicle and a moving trajectory of the pedestrian or the like intersect each other. For example, a laser light projector provided in the vicinity of a vehicle interior rear-view mirror emits light to a predetermined area corresponding to the predicted and detected intersecting position.

Patent Literature 2 discloses a pedestrian notification device that calls attention of a driver of the own vehicle, a pedestrian, or the like. According to this device, a pedestrian ahead of a vehicle is detected by a sensor. For example, a digital micromirror device (DMD) provided in the vicinity of a bumper at a front side of the vehicle emits marking light that gradually comes close to the detected pedestrian to a road surface.

CITATION LIST

Patent Literature

PTL 1: JP-A-2005-161977 (see paragraph 0019 and FIG. 2)

PTL 2: JP-A-2014-46838 (see paragraph 0038 and FIG. 6)

SUMMARY OF INVENTION

Technical Problem

In Patent Literatures 1 and 2, the laser light projector or the DMD device emits light to a predetermined area where a pedestrian or the like can see, and the laser light projector or the DMD device is used in pairs with vehicle head lamps that illuminate a front side in a traveling direction of a vehicle. However, since the laser light projector or the DMD device is provided separately from the head lamps, the number of components is large and it is troublesome for assembling to a vehicle body.

A driver of the own vehicle or another vehicle can know (can be warned) that there is a pedestrian or the like by the light emitted to the road surface. On the other hand, the pedestrian or the like can know (can be warned) that a vehicle is coming by the light emitted to the road surface. However, the pedestrian or the like cannot know a detailed condition of the road surface that the pedestrian or the like is about to cross even when light is emitted to the road surface. In particular, on a dark road having no street light or the like, an emitted area is bright, but a non-emitted area is relatively dark. Therefore, particularly a pedestrian or the like who is crossing a road cannot accurately determine whether the pedestrian or the like should continue to cross the road or whether the pedestrian or the like should return.

The present disclosure provides an illuminating lamp for a vehicle capable of forming a predetermined light distribution and calling attention of a pedestrian or the like who is crossing a road or is about to cross a road by emitting predetermined light to a road surface

Solution to Problem

An illuminating lamp for a vehicle according to an aspect of the present disclosure includes a first emitting unit configured to form a predetermined light distribution, a second emitting unit configured to emit predetermined light to a road surface ahead of the vehicle, and a control device configured to control the second emitting unit to emit light to a crossing prediction area that includes a low speed moving body crossing or about to cross a road in a predicted traveling trajectory of the vehicle and that extends in a road crossing direction of the low speed moving body based on detection information indicating that the low speed moving body is detected. The first emitting unit and the second emitting unit are housed in a housing including a lamp body having an opening at a front side of the vehicle and a cover attached to the opening of the lamp body.

(Effect) The first emitting unit and the second emitting unit are housed in the housing and are integrated with the illuminating lamp for a vehicle. Accordingly, as compared with the related art in which the second emitting unit (the laser light projector or the DMD device) is provided separately from the first emitting unit, the illuminating lamp for a vehicle according to the present disclosure has a small number of components and is easily assembled to a vehicle body. That is, it is possible to provide an illuminating lamp for a vehicle capable of forming a predetermined light distribution and calling attention of a pedestrian or the like who is crossing a road or is about to cross a road by emitting predetermined light to a road surface.

The control device sets a crossing prediction area (a direction, a width, and a length) for the low speed moving body on the predicted vehicle traveling trajectory based on the detection information indicating that the low speed moving body is crossing a road or is about to cross a road in the predicted vehicle traveling trajectory. For example, the control device controls the second emitting unit to emit light to the crossing prediction area only when there is a risk of the own vehicle colliding or coming into contact with the pedestrian or the like.

Therefore, corresponding to the crossing prediction area of the low speed moving body, the control device brightly illuminates a predetermined area (an area having a predetermined width and a predetermined length and extending in a predetermined direction from the low speed moving body) crossing the road from a position including the low speed moving body such as a pedestrian who is crossing a road or is about to cross a road ahead of the vehicle in the vehicle traveling direction. Accordingly, a driver of the own vehicle or another vehicle can know (can be warned) the presence of the low speed moving body such as a pedestrian who is crossing the road or is about to cross the road.

On the other hand, the low speed moving body such as a pedestrian can accurately know (can be warned) the presence of an approaching vehicle. Further, the low speed moving body can know a detailed condition of a road surface in a crossing direction of a road that the low speed moving body is crossing or is about to cross.

Therefore, the pedestrian or the like who is about to cross a road can accurately determine whether the pedestrian or the like should cross the road right now or should wait after a vehicle passes. Further, the pedestrian or the like who is crossing the road can accurately determine whether the pedestrian or the like should continue to cross the road or should return.

In the illuminating lamp for a vehicle according to the aspect, the control device may be configured to gradually increase the crossing prediction area to a front side in the road crossing direction based on a moving speed or a predicted moving speed of the low speed moving body in the road crossing direction.

(Effect) A length of the crossing prediction area set by the control device is gradually increased to a front side in the road crossing direction based on a speed or a predicted speed of the low speed moving body. This is particularly effective when a pedestrian or the like who is crossing a road continues to cross the road since the road surface ahead in a moving direction is always brightly illuminated.

On the other hand, the driver of the own vehicle or an oncoming vehicle gradually expands the area that is brightly illuminated in a road crossing direction. Therefore, the driver of the own vehicle or the oncoming vehicle can be warned about the low speed moving body such as a pedestrian who is crossing a road or is about to cross a road.

In the illuminating lamp for a vehicle according to the aspect. The control device may be configured to adjust a width of the crossing prediction area corresponding to a width of the low speed moving body.

(Effect) When there are a plurality of low speed moving bodies such as pedestrians who are crossing a road or are about to cross a road and a width of the low speed moving bodies is large, an area having a width corresponding to the width of the low speed moving bodies detected by a low speed moving body detection unit is brightly illuminated. Accordingly, all of the plurality of pedestrians or the like can accurately know the presence of an approaching vehicle and can know a condition of a road surface to be crossed.

Further, a driver of the own vehicle and a driver of an oncoming vehicle are warned about the plurality of low speed moving bodies that are crossing a road or are about to cross a road.

In the illuminating lamp for a vehicle according to the aspect, the first emitting unit is a low beam forming optical unit, and the second emitting unit is a figure rendering forming optical unit including a DMD device.

(Effect) In housings of a pair of left and right illuminating lamps, a low beam forming optical unit and a high beam forming optical unit are provided to be bilaterally symmetrical as viewed from a front side of a vehicle. In general, in the housing of each illuminating lamp, the low beam forming optical unit is provided at a vehicle width direction outer side and the high beam forming optical unit is provided at a vehicle width direction inner side.

Accordingly, visibility of the illuminating lamps is bilaterally symmetrical from a front side of the vehicle when the illuminating lamps are turned on and when the illuminating lamps are turned off, and a good appearance is ensured.

In the present disclosure, a low beam forming optical unit and a figure rendering forming optical unit having a DMD device are provided in a housing. For example, among a pair of left and right illuminating lamps, a low beam forming optical unit and a figure rendering forming optical unit having a DMD device may be provided in the housing of the right illuminating lamp, and a low beam forming optical unit having the same structure as the low beam forming optical unit of the right illuminating lamp and a high beam forming optical unit having the same structure as the figure rendering forming optical unit may be provided in the housing of the left illuminating lamp.

With such a structure, when a high beam is formed, since the figure rendering forming optical unit is not turned on and the high beam forming optical unit is turned on, an appearance of the illuminating lamps is not bilaterally symmetrical as viewed from a front side of the vehicle when the high beam is formed. However, when a high beam is formed, since the low beam forming optical unit in each of the left and right illuminating lamps is turned on, feeling of strangeness at the time of turning on the illuminating lamps is little.

Advantageous Effects of Invention

According to the present disclosure, it is possible to provide an illuminating lamp for a vehicle capable of forming a predetermined light distribution and calling attention of a pedestrian or the like who is crossing a road or is about to cross a road by emitting predetermined light to a road surface.

BRIEF DESCRIPTION OF RENDERINGS

Figure 13A:
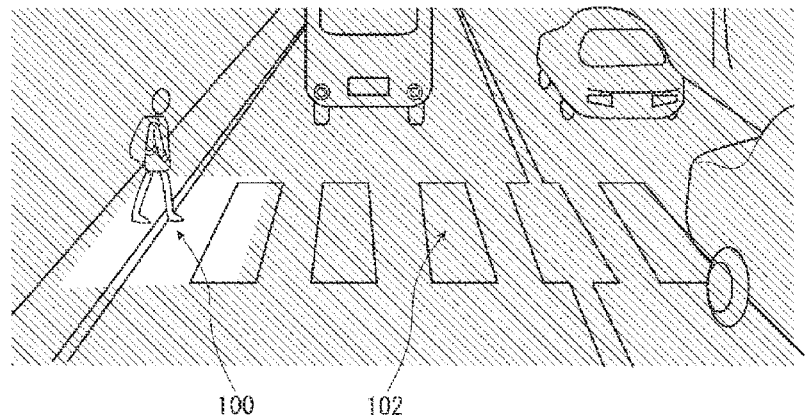
FIG. 13A is a diagram showing a state in which the figure rendering forming optical unit emits light to a predetermined area (an entire rectangular area having a dimension corresponding to a dimension of a pedestrian crossing) including a pedestrian who crosses a road according to a fourth embodiment.
Figure 13B:
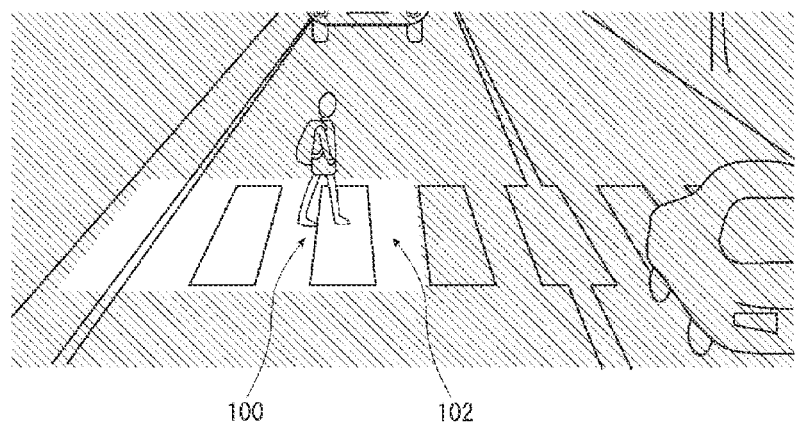

FIG. 13B is a diagram showing a state in which the figure rendering forming optical unit emits light to a predetermined area (an entire rectangular area having a dimension corresponding to a dimension of a pedestrian crossing) including a pedestrian who crosses a road according to the fourth embodiment, and an emitted area is expanded in a moving direction of the pedestrian from the state shown in FIG. 13A.

Figure 13C:
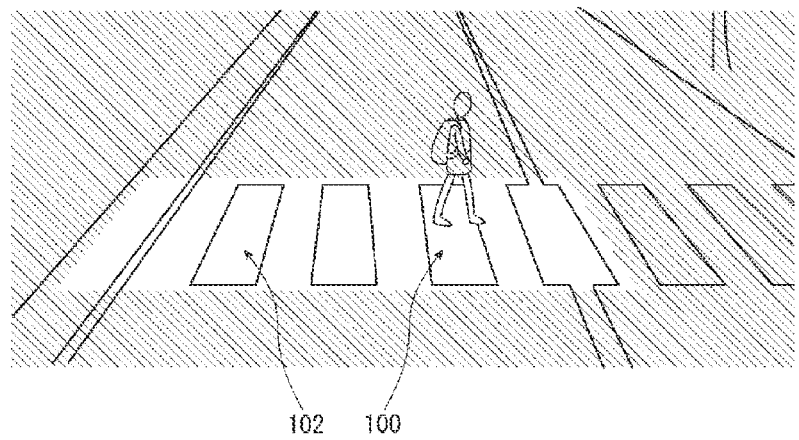

FIG. 13C is a diagram showing a state in which the figure rendering forming optical unit emits light to a predetermined area (an entire rectangular area having a dimension corresponding to a dimension of a pedestrian crossing) including a pedestrian who crosses a road according to the fourth embodiment, and an emitted area is expanded in a moving direction of the pedestrian from the state shown in FIG. 13B.

DESCRIPTION OF EMBODIMENTS

Hereinafter, preferred embodiments of the present disclosure will be described with reference to the drawings. In addition, the embodiments are not intended to limit the invention, and all the features and combinations described in the embodiments are not necessarily essential to the invention.

Directions shown in the drawings (upper: Up, lower: Lo, left: Le, Right: Ri, front: Fr, rear: Re) are directions of a vehicle and vehicle head lamps assumed to be viewed by a driver from a driving seat of the vehicle.

First Embodiment

Figure 1:
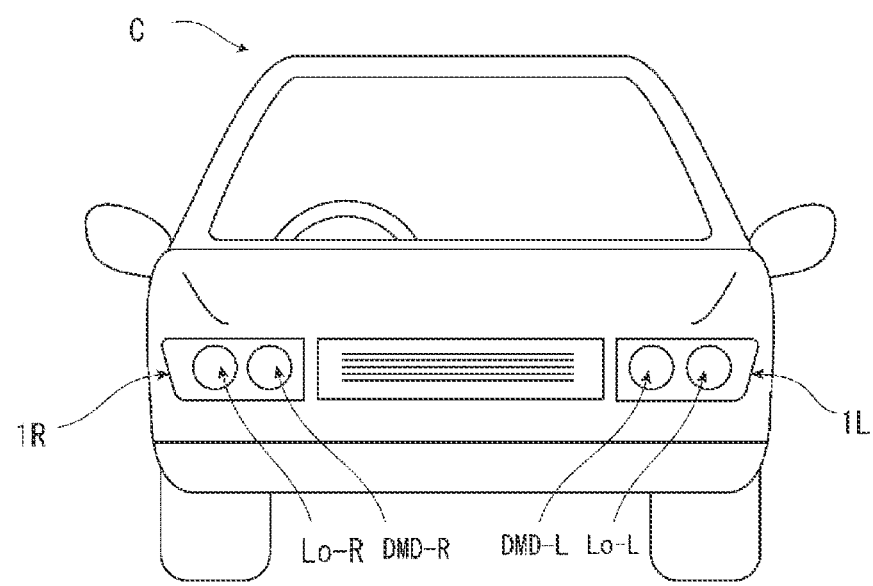
FIG. 1 is a front view showing a vehicle equipped with vehicle head lamps according to a first embodiment.
Figure 1:
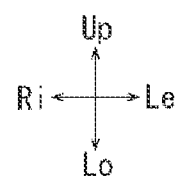

An illuminating lamp for a vehicle according to the present disclosure is applied to vehicle head lamps in the first embodiment. A vehicle C shown in FIG. 1 includes a left head lamp 1L and a right head lamp 1R. A pair of left and right head lamp 1L and head lamp 1R constitute vehicle head lamps. The vehicle C is a right-hand drive vehicle in the present embodiment. The right head lamp 1R is mounted at a right side (left side in FIG. 1) of the vehicle C that is a driving seat side, and the left head lamp 1L is mounted at a left side (right side in FIG. 1) of the vehicle C that is a front passenger seat side.

Figure 2:
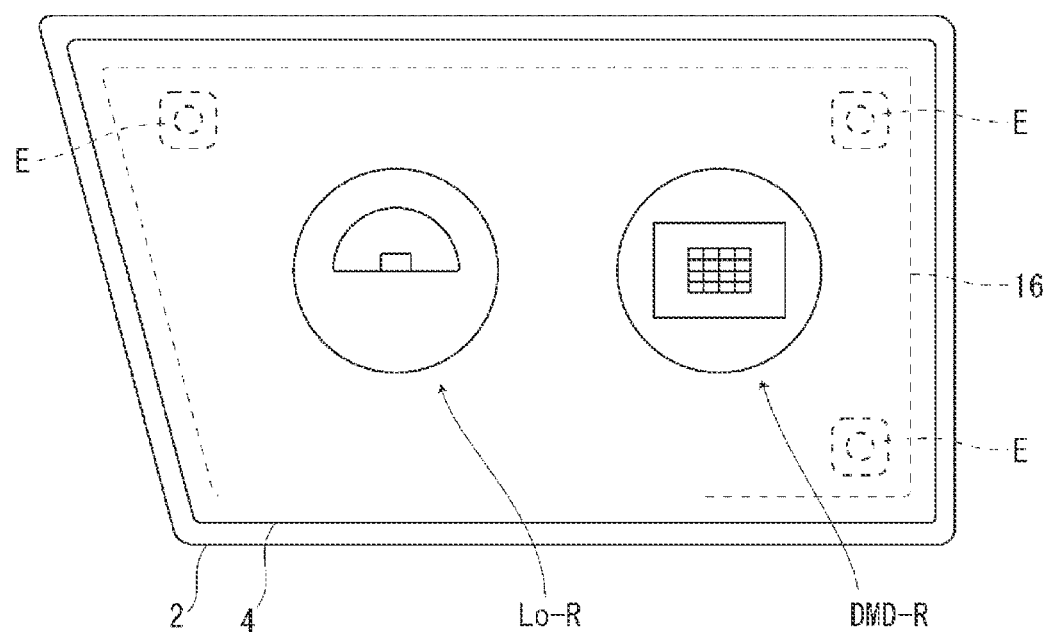
FIG. 2 is a front view showing a right head lamp (driving seat side).
Figure 3:
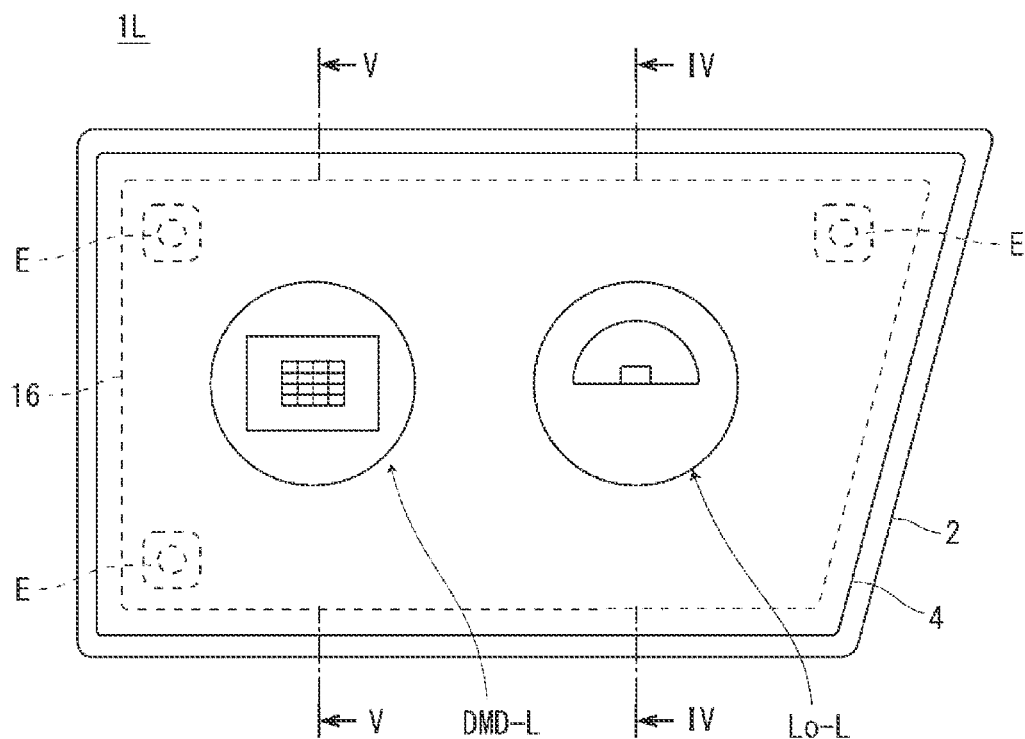
FIG. 3 is a front view showing a left head lamp (front passenger seat side).
Figure 3:
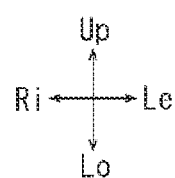

As shown in FIGS. 2 and 3, each of the right head lamp 1R and the left head lamp 1L includes a lamp body 2 having an opening at a front side of the vehicle C, and a front cover 4 attached to the opening of the lamp body 2. The front cover 4 is formed of resin, glass, or the like having transparency. The lamp body 2 and the front cover 4 constitute a housing.

A figure rendering forming optical unit DMD-R and a low beam forming optical unit Lo-R are housed in this order from a vehicle width direction inner side (right side in FIG. 1) in the housing of the right head lamp 1R. The low beam forming optical unit Lo-R is an example of a first emitting unit. The figure rendering forming optical unit DMD-R is an example of a second emitting unit.

On the other hand, a high beam forming optical unit DMD-L and a low beam forming optical unit Lo-L are housed in this order from a vehicle width direction inner side (left side in FIG. 1) in the housing of the left head lamp 1L.

That is, a shape of the right head lamp 1R and a shape of the left head lamp 1L are bilaterally symmetrical. The low beam forming optical unit Lo-R and the figure rendering forming optical unit DMD-R in the housing of the right head lamp 1R and the low beam forming optical unit Lo-L and the high beam forming optical unit DMD-L in the housing of the left head lamp 1L are provided to be bilaterally symmetric. In the present embodiment, the optical unit Lo-R is provided at a vehicle width direction outer side and the optical unit DMD-R is provided at a vehicle width direction inner side in the housing of the head lamp 1R. Similarly, the optical unit Lo-L is provided at a vehicle width direction outer side and the optical unit DMD-L is provided at a vehicle width direction inner side in the housing of the head lamp 1L.

As shown in FIG. 2, the low beam forming optical unit Lo-R and the figure rendering forming optical unit DMD-R are attached to a support member 16 and are integrated with each other in the right head lamp 1R. On the other hand, the low beam forming optical unit Lo-L and the high beam forming optical unit DMD-L are attached to the support member 16 and are integrated with each other in the left head lamp 1L. In both the left and the right head lamps 1L and 1R, the support member 16 is attached to the lamp body 2 by three aiming screws E. Then, an optical axis of each of the Lo-R and DMD-R can be integrally tilt-adjusted in upper, lower, right, and left directions in the right head lamp 1R by rotating the aiming screws E. An optical axis of each of the optical units Lo-L and DMD-L can be integrally tilt-adjusted in upper, lower, right, and left directions in the left head lamp 1L by rotating the aiming screws E.

Figure 4:
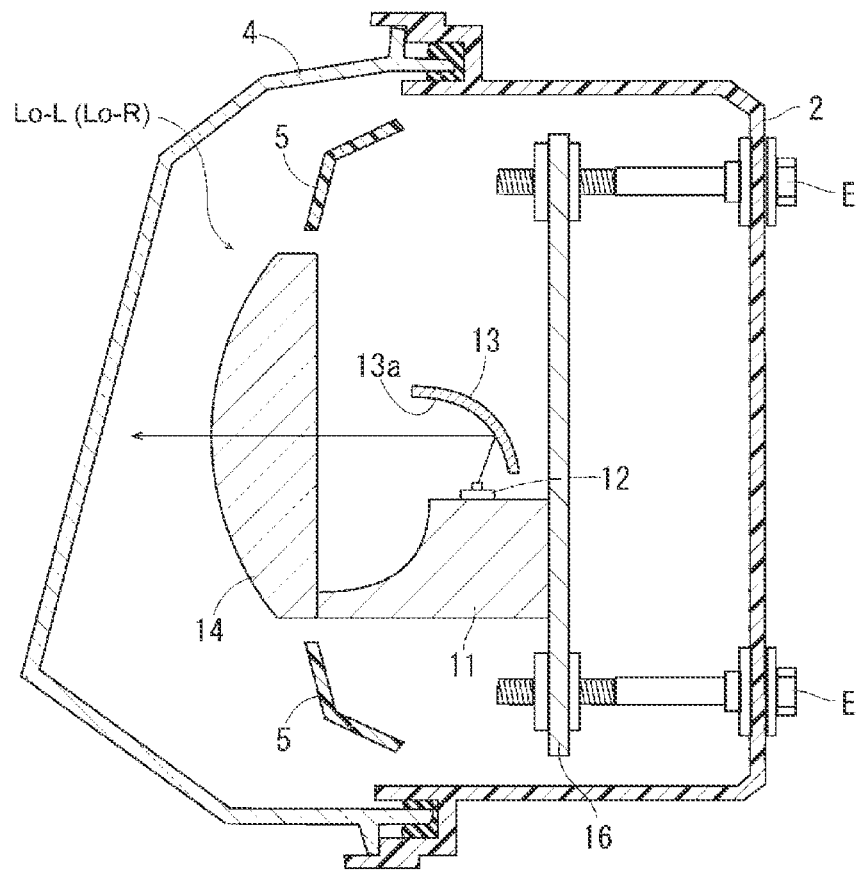
FIG. 4 is a cross sectional view taken along a line IV-IV in FIG. 3 and showing a configuration of a low beam forming optical unit.
Figure 4:
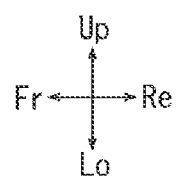

FIG. 4 is a cross sectional view taken along a line IV-IV in FIG. 3 and showing a configuration of the low beam forming optical unit Lo-L provided in the housing of the left head lamp 1L. The low beam forming optical unit Lo-R provided in the housing of the right head lamp 1R has the same configuration as the low beam forming optical unit Lo-L provided in the left head lamp 1L.

Figure 5:
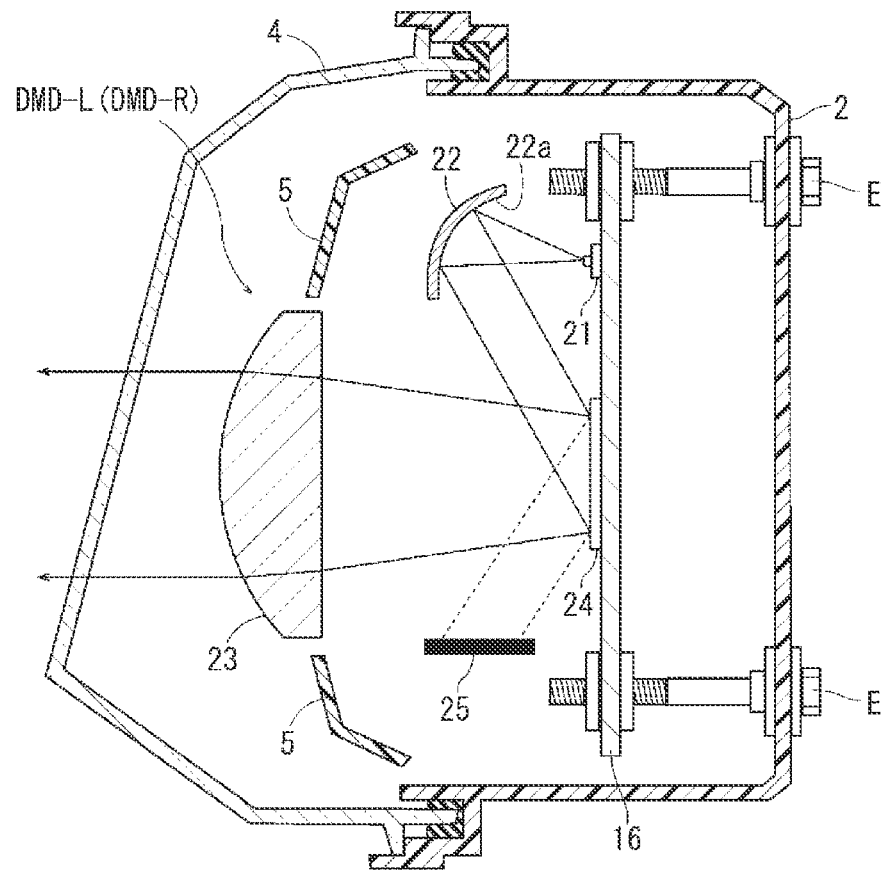
FIG. 5 is a cross sectional view taken along a line V-V in FIG. 3 and showing a configuration of a high beam forming optical unit and a figure rendering forming optical unit.
Figure 5:
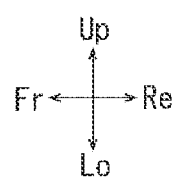

FIG. 5 is a cross sectional view taken along a line V-V in FIG. 3 and showing a configuration of a high beam forming optical unit DMD-L provided in the housing of the left head lamp 1L. The figure rendering forming optical unit DMD-R provided in the housing of the right head lamp 1R has the same configuration as the high beam forming optical unit DMD-L provided in the left head lamp 1L.

In FIGS. 4 and 5, a reference numeral 5 denotes an extension reflector 5 formed into, for example, a specular color. For example, the extension reflector 5 is interposed and held by a peripheral edge portion of the opening of the lamp body 2 and the front cover 4. The extension reflector 5 is provided among the optical units Lo-L, DMD-L, Lo-R, and DMD-R and the lamp body 2. Since the extension reflector 5 hides the entire housing excluding projection lenses 14 and 23 of each optical unit, the head lamps 1R and 1L have a good appearance viewed from a front side of the vehicle.

Low Beam Forming Optical Units Lo-R and Lo-L

Each of the low beam forming optical units Lo-R and Lo-L emits a low beam (passing beam) to a front side of the vehicle C. As shown in FIG. 4, each of the low beam forming optical units Lo-R and Lo-L includes a light source 12 that is a light emitting element, a reflector 13, and a transparent or translucent projection lens 14. The light source 12 and the projection lens 14 are attached to a metal bracket 11 fixed to the support member 16. The reflector 13 is fixed to the support member 16 via a member (not shown).

Examples of the light source 12 include a semiconductor light emitting element such as a light emitting diode (LED), a laser diode (LD), and an electro luminescence (EL) element, a lamp bulb, an incandescent lamp (halogen lamp), and discharge (discharge lamp).

The reflector 13 guides light emitted from the light source 12 to the projection lens 14. An inner surface of the reflector 13 is a predetermined reflecting surface 13a.

The projection lens 14 is, for example, a free-form surface lens that has a front surface and a rear surface each having a free-form surface shape.

Light emitted from the light source 12 is reflected to a front side by the reflecting surface 13a of the reflector 13 and passes through the projection lens 14 and the front cover 4. Then, the light is emitted to a front side and forms a low beam light distribution to a front side of the vehicle C.

Although the low beam forming optical units Lo-R and Lo-L are of a projector type in the present embodiment, the low beam forming optical units Lo-R and Lo-L are not limited thereto. The low beam forming optical units Lo-R and Lo-L may adopt a known configuration in the related art and may be an optical unit of a reflector type or the like. A type of the low beam forming optical units Lo-R and Lo-L is not limited.

Low beam light distribution patterns PLo (see FIGS. 8A and 8B) are formed ahead of the vehicle C by the low beam forming optical units Lo-R and Lo-L, respectively. These light distribution patterns PLo and PLo are combined to form a light distribution pattern of a low beam of the head lamps.

Figure Rendering Forming Optical Unit DMD-R and High Beam Forming Optical Unit DMD-L The figure rendering forming optical unit DMD-R forms a predetermined figure using light emitted to a front side of the vehicle C. The high beam forming optical unit DMD-L forms a predetermined light distribution pattern using light emitted to a front side of the vehicle C. As shown in FIG. 5, each of the figure rendering forming optical unit DMD-R and the high beam forming optical unit DMD-L includes a light source 21, a reflective optical member 22, a projection lens 23, a light deflection device 24, and a light absorption member 25. The light source 21 and the light deflection device 24 are directly attached to a front surface of the support member 16. The components 21, 22, 23, and 25 are integrated with the support member 16 excluding the extension reflector 5.

The light source 21 is an LED, The light source 21 may include a light collection member such as a convex lens so as to guide most light from the light source 21 to the reflective optical member 22.

The reflective optical member 22 guides the light emitted from the light source 21 to a reflecting surface of the light deflection device 24. An inner surface of the reflective optical member 22 is a predetermined reflecting surface 22a. When the light emitted from the light source 21 is directly guided to the reflecting surface of the light deflection device 24, the reflective optical member 22 may not be provided.

The light deflection device 24 is disposed on an optical axis of the projection lens 23, and selectively reflects the light emitted from the light source 21 to the projection lens 23.

Figure 6A:
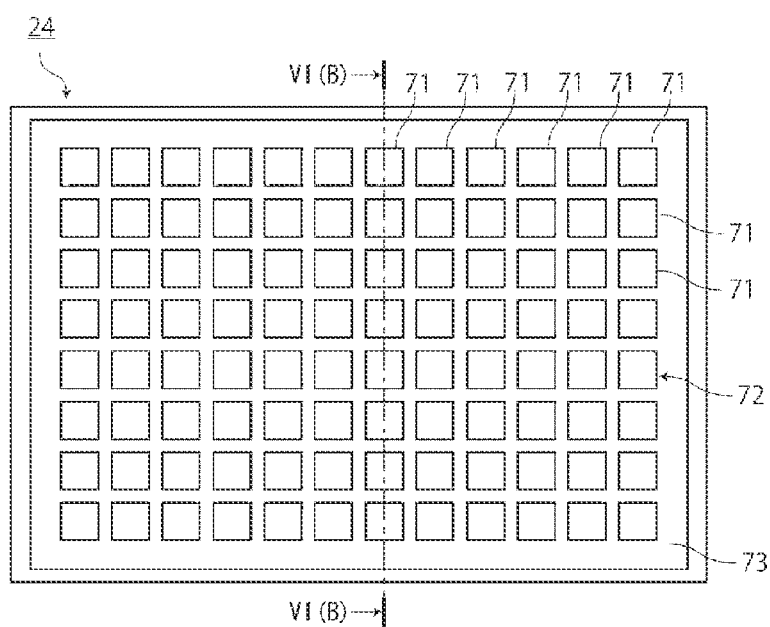
FIG. 6A is a front view showing a schematic configuration of a light deflection device.
Figure 6B:
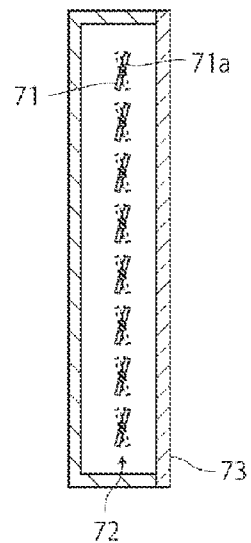
FIG. 6B is a cross sectional view taken along a line VI(B)-VI(B) in FIG. 6A.

As shown in FIGS. 6A and 6B, the light deflection device 24 is implemented by arranging a plurality of minute mirror elements such as a digital mirror device (DMD) and a micro electro mechanical system (MEMS) in a matrix. The light deflection device 24 is a DMD device using a DMD in the present embodiment. A reflection direction of the light emitted from the light source 21 can be selectively changed by controlling an angle of a reflecting surface of each of a plurality of mirror elements 71. That is, a part of the light emitted from the light source 21 can be emitted toward the projection lens 23, and the other light can be reflected toward a direction in which the other light cannot be effectively used as a light distribution. Here, the direction in which the light cannot be effectively used may be a direction in which an influence of reflected light is small (a direction that hardly contributes to formation of a desired light distribution pattern), a direction toward a light absorption member (a shield member), or the like. The direction in which the light cannot be effectively used is a direction toward the light absorption member 25 in the present embodiment.

The projection lens 23 projects a light source image formed on a rear focal plane including a rear focal point of the projection lens 23 onto a virtual vertical screen ahead of the right head lamp 1R (or the left head lamp 1L) as an inverted image. The projection lens 23 is disposed in a manner in which the rear focal point of the projection lens 23 is positioned on an optical axis of the figure rendering forming optical unit DMD-R (or the high beam forming optical unit DMD-L) and in the vicinity of the reflecting surface of the light deflection device 24.

A surface of the light absorption member 25 is subjected to non-reflection coating, and the light absorption member 25 absorbs light reflected from the light deflection device 24 so that the light is neither reflected nor pass through.

The light emitted from the light source 21 is reflected by the reflecting surface of the reflective optical member 22 to the light deflection device 24. A part of the light is reflected to a front side by the light deflection device 24 and passes through the projection lens 23 and the front cover 4. Then, the light is emitted to a front side of the vehicle. The other light that is not reflected to a front side by the light deflection device 24 is reflected toward the light absorption member 25 and is absorbed by the light absorption member 25.

Light Deflection Device 24

Next, the light deflection device 24 including the DMD will be described in detail.

As shown in FIG. 6A, the light deflection device 24 includes a micromirror array 72 in which a plurality of minute mirror elements 71 are arranged in a matrix. Each of the mirror elements 71 has a quadrangular shape (such as a square shape, a rhombus shape, a rectangular shape, and a parallelogram). The mirror element 71 has a reflecting surface 71a that reflects light on the surface. The light deflection device 24 includes a transparent cover member 73 such as glass or plastic provided at a front side of the reflecting surface 71a of the mirror element 71.

Each of the mirror elements 71 in the micromirror array 72 can be switched between an ON state (a solid line position shown in FIG. 6B) and an OFF state (a broken line position shown in FIG. 6B). The ON state is a first state in which each mirror element 71 reflects light emitted from the light source 21 toward the projection lens 23 so that the light is used as a desired light distribution pattern. The OFF state is a second state in which each mirror element 71 reflects light emitted from the light source 21 so that the light is not effectively used.

FIG. 5 shows light reflected by the light deflection device 24 when the mirror element 71 of the light deflection device 24 is in the ON state (indicated by a solid line) and reflected light (indicated by a broken line) when the mirror element 71 of the light deflection device 24 is in the OFF state.

The mirror element 71 has a pivot shaft at a position substantially bisecting the mirror element 71. The mirror element 71 can be switched between the ON state and the OFF state about the pivot shaft.

A reflection position of the light emitted from the light source 21 can be selectively changed by independently controlling the ON and OFF states of the mirror element 71, so that a desired reflection image and a desired light distribution pattern can be obtained.

The control of the mirror element 71 is binary control of ON/OFF, and a tone of brightness and darkness of light can be represented. For example, the tone of brightness and darkness of light can be represented by adjusting a time ratio of the ON or OFF state when the ON and OFF states are switched at high speed. Alternatively, the tone of brightness and darkness of light can be represented by adjusting a density of the mirror elements 71 in the ON state by thinning out the mirror elements 71 in the ON state in a certain area. That is, a tone of a projection image can be represented by a gray scale.

When a projection image is represented in color, light source units of three or more colors such as red, green, and blue in the light source 21 are used to emit light to the light deflection device 24 in a time division manner, and the mirror elements 71 is in the ON state at the time of emitting a projected color. Since the ON and OFF states of the mirror elements 71 are switched in a division of thousands times per second, a person seeing the reflective light recognizes the reflective light of the mirror elements 71 as mixed light due to an illusion (afterimage effect) of human eyes. An image of various colors can be represented by combining turning on time of a light source unit of each color and an ON/OFF time ratio of the mirror elements 71.

Figure 8A:
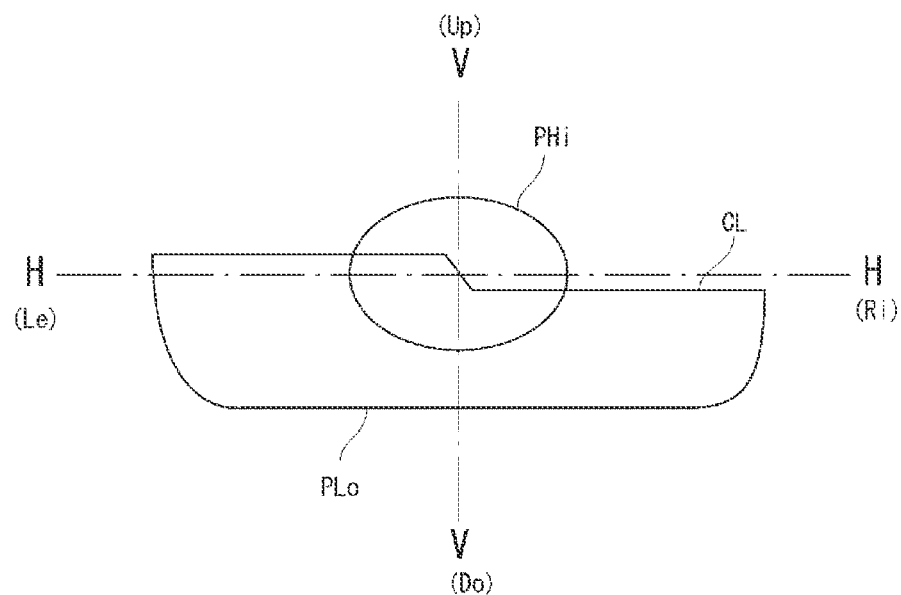
FIG. 8A shows a light distribution pattern of a vehicle left head lamp.

FIG. 8A shows a light distribution pattern formed by the left head lamp 1R. A reference symbol PLo indicates a light distribution pattern that is formed by the low beam forming optical unit Lo-L and widely diffuses to the left and right with a clear cut-off line CL. A reference numeral PD indicates a light distribution pattern that is formed by the high beam forming optical unit DMD-L and has high luminance converged in the vicinity of the center of a light distribution screen.

Figure 8B:
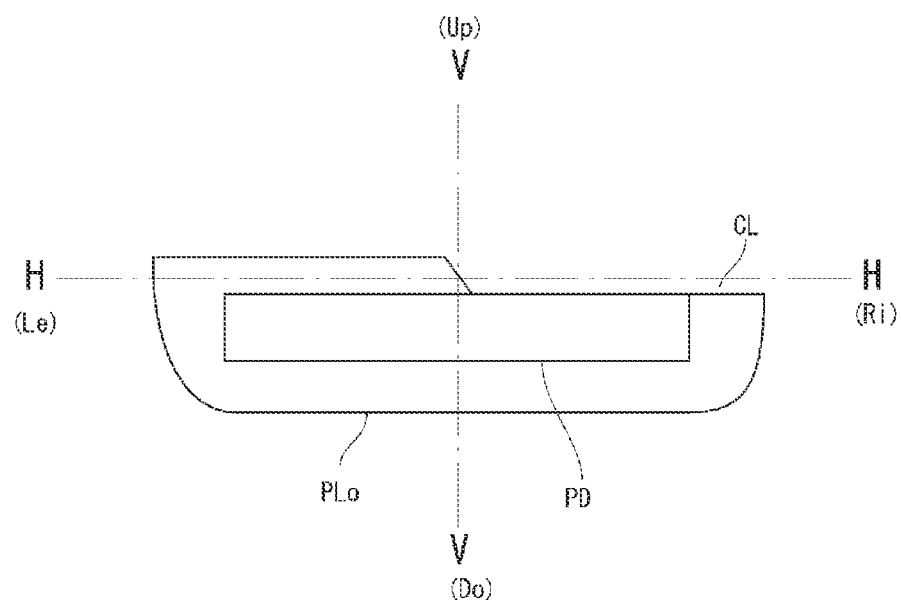
FIG. 8B shows a light distribution pattern of a vehicle right head lamp.

FIG. 8B shows a light distribution pattern formed by the right head lamp 1R. A reference symbol PLo indicates a light distribution pattern that is formed by the low beam forming optical unit Lo-R and widely diffuses to the left and right with a clear cut-off line CL. A reference numeral PD indicates a light distribution pattern (rendering) formable area where a light distribution pattern can be formed by the figure rendering forming optical unit DMD-R. The figure rendering forming optical unit DMD-R can freely adjust a position, an upper-lower width, and a length in the left-right direction of a light distribution pattern (rendering) in the light distribution pattern (rendering) formable area PD by controlling ON or OFF of the mirror elements 71.

Figure 7:
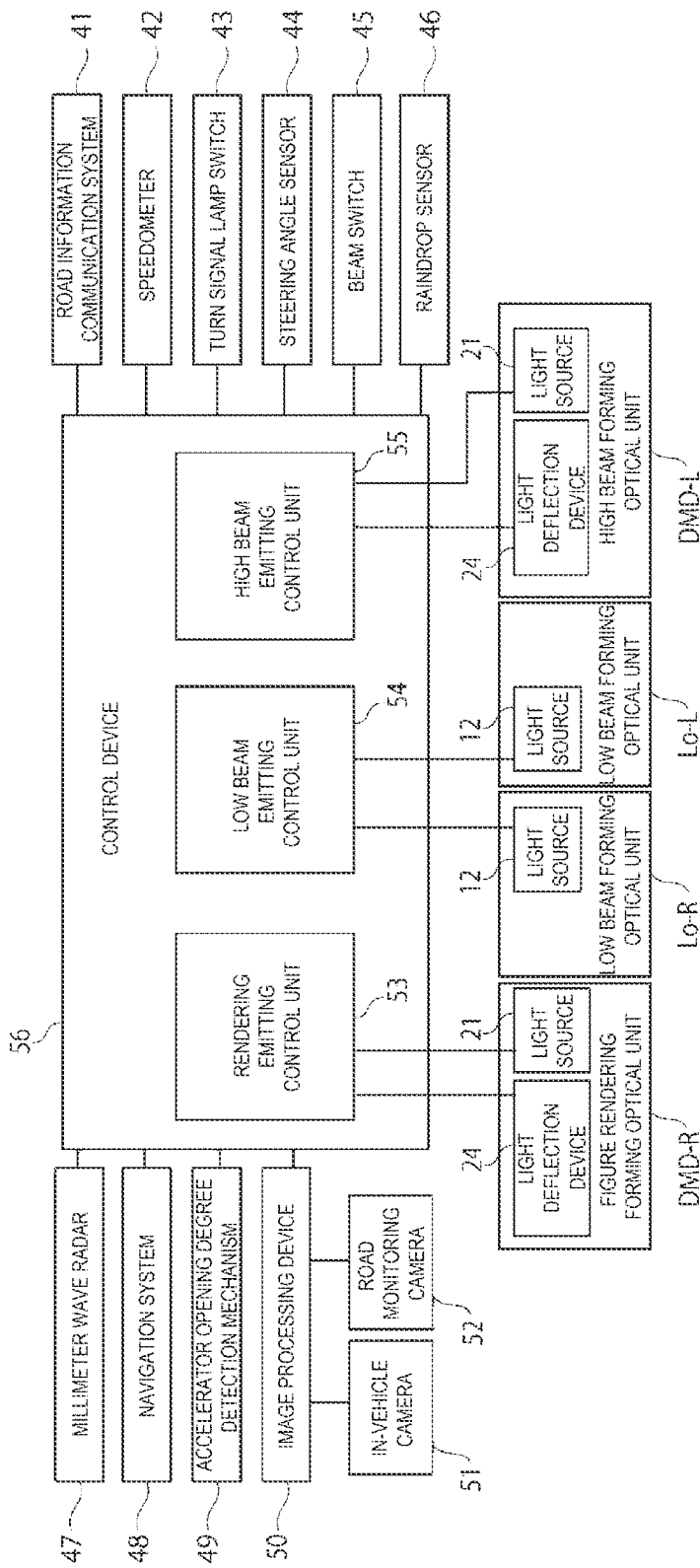
FIG. 7 is a block diagram showing a control device that controls a light distribution of the vehicle head lamps and a light distribution of the figure rendering forming optical unit.

Block Diagram Showing Control Device that Controls Light Distributions of Head Lamps Formed by Low Beam Forming Optical Unit and High Beam Forming Optical Unit and Light Distribution (Rendering) Formed by Figure Rendering Forming Optical Unit Next, a configuration of a control device 56 that controls light distributions of the optical units Lo-R, Lo-L, DMD-R, and DMD-L will be described with reference to FIG. 7. A hardware configuration of the control device 56 is implemented by an element or a circuit including a CPU or a memory of a computer. A software configuration of the control device 56 is implemented by a computer program or the like. The CPU executes a control program stored in the memory, and generates various control signals.

The control device 56 includes a rendering emitting control unit 53, a low beam emitting control unit 54, and a high beam emitting control unit 55.

The rendering emitting control unit 53 adjusts an output intensity of the light source 21 of the figure rendering forming optical unit DMD-R and controls the ON and OFF of the mirror elements 71 of the light deflection device 24.

The high beam emitting control unit 55 adjusts an output intensity of light source 21 of the high beam forming optical unit DMD-L and controls the ON and OFF of the mirror elements 71 of the light deflection device 24, based on a signal from a beam switch 45 for switching between a low beam and a high beam.

The control device 56 is connected to a road information communication system 41, a speedometer 42, a turn signal lamp switch 43, a steering angle sensor 44, the beam switch 45, a raindrop sensor 46, a millimeter wave radar 47, a navigation system 48, an accelerator opening degree detection mechanism 49, an image processing device 50, and the like. A road monitoring camera 52 and an in-vehicle camera 51 are connected to the image processing device 50.

The road monitoring camera 52 includes an intersection camera provided at an intersection, a monitoring camera that is installed near a road and captures a dynamic image or a still image of a road surface condition, a pedestrian, a vehicle such as a bicycle, a motorcycle, and a car, an obstacle, and the like. The in-vehicle camera 51 includes a camera that is mounted in the own vehicle or another vehicle and captures a dynamic image or a still image of surroundings of the vehicle, or the like. The image processing device 50 is connected to the road monitoring camera 52 via a communication line such as the Internet, and acquires a video and image data from the road monitoring camera 52. The image processing device 50 acquires a video and image data from the in-vehicle camera 51 mounted on another vehicle via a predetermined communication line. The image processing device 50 performs an analysis processing on the video or the like captured by the in-vehicle camera 51, the road monitoring camera 52, or the like, and transmits data to the control device 56.

The road information communication system 41 receives data related to rainfall on a traveling road, a freezing condition of a road, and a road surface condition of a traveling road via a communication line such as the Internet, and transmits the data to the control device 56.

The turn signal lamp switch 43 detects a signal indicating a left or a right turn signal lamp is turned on, and transmits a data signal to the control device 56. The steering angle sensor 44 detects a signal indicating how much a steering wheel is turned in a left or right direction, and transmits a data signal to the control device 56. The speedometer 42 detects a traveling speed of the own vehicle and transmits a data signal to the control device 56. The accelerator opening degree detection mechanism 49 detects an amount indicating how much an accelerator is stepped on, and transmits a data signal to the control device 56. The raindrop sensor 46 detects a signal related to rainfall when a vehicle travels, and transmits a data signal to the control device 56. The millimeter wave radar 47 detects a distance or a relative speed with respect to another vehicle or a pedestrian in a front-rear direction or at a side of the vehicle C, and transmits a data signal to the control device 56.

Since the navigation system 48 has, for example, a GPS (not shown) or map data, the navigation system 48 transmits a data signal related to a current position of the own vehicle to the control device 56.

According to the data signals received from the detection devices described above, the control device 56 knows and analyzes a traveling state of the own vehicle or a vehicle surrounding state, such as a position of a retro-reflective object such as an oncoming vehicle, a preceding vehicle, a pedestrian, a pedestrian crossing, a sign, and a signboard, a road shape, and weather. Then, the control device 56 determines an appropriate light distribution pattern based on these states, and transmits a control signal to the high beam emitting control unit 55. For example, the control device 56 determines a light distribution pattern for shading a part of light from the oncoming vehicle or the preceding vehicle so that the light does not become glare light, and transmits a control signal to the high beam emitting control unit 55. Accordingly, the high beam forming optical unit DMD-L emits light for forming an optimum high beam PHi.

At the same time, the control device 56 determines a rendering figure such as a mark and a character for calling attention of a driver of the own vehicle or another vehicle, a pedestrian, or the like according to a necessity determined based on the above analysis, and transmits a control signal to the rendering emitting control unit 53. Accordingly, the figure rendering forming optical unit DMD-R emits light to a predetermined area including feet of a pedestrian or the like so as to call attention of the pedestrian or the like.

For example, based on data obtained from the navigation system 48, the speedometer 42, the steering angle sensor 44, and the like, the control device 56 predicts and determines traveling time of the own vehicle and a traveling trajectory of the traveling own vehicle (for example, a band-shaped traveling trajectory that the own vehicle travels on a road in five seconds). A width of the traveling trajectory of the own vehicle is, for example, a width including a road shoulder.

Based on data obtained from the in-vehicle camera 51, the monitoring camera 52, the image processing device 50, and the like, the control device 56 determines whether there is a pedestrian or the like who is crossing a road and or is about to cross a road within the predicted traveling trajectory of the own vehicle, or whether there is a pedestrian crossing when there is a pedestrian or the like.

The control device 56 determines whether there is a risk of the own vehicle colliding with or coming into contact with a pedestrian or the like based on the predicted traveling trajectory of the own vehicle and the detected data such as a pedestrian or the like. Only when the control device 56 determines that there is such a risk, the control device 56 controls the figure rendering forming optical unit DMD-R to emit light to a predetermined area including a pedestrian or the like.

Specifically, the control device 56 determines whether the detected pedestrian or the like is crossing a road or is about to cross a road based on a position of the detected pedestrian or the like (whether the pedestrian or the like is on a traveling road or is on a pedestrian crossing), a state of the pedestrian or the like, and a moving speed of the pedestrian or the like. When the control device 56 determines the pedestrian or the like is crossing a road or is about to cross a road, the control device 56 determines a "crossing prediction area (position, moving direction, length, and width)" that is an area predicted when the pedestrian or the like crosses a road, based on data of a position of the pedestrian or the like, a dimension of the pedestrian or the like (the number of pedestrians, the number of bicycles), a moving direction of the pedestrian or the like, and a moving speed of the pedestrian or the like. For example, when the number of the detected pedestrians or the like is one, the control device 56 determines a rectangular area having a predetermined width (for example, a width of 3 m) and a length (for example, 4 m) corresponding to a width of a road as a "crossing prediction area" (see FIG. 10).

The control device 56 is not limited to determining a rectangular area crossing over the entire road as a "crossing prediction area". For example, the control device 56 may set a rectangular area having a predetermined width and a length corresponding to ⅓ of a width of a road as a "crossing prediction area", and may determine to gradually increase the length of the "crossing prediction area" in accordance with time or a movement of a pedestrian or the like (see FIGS. 11A to 11C).

Figure 12:
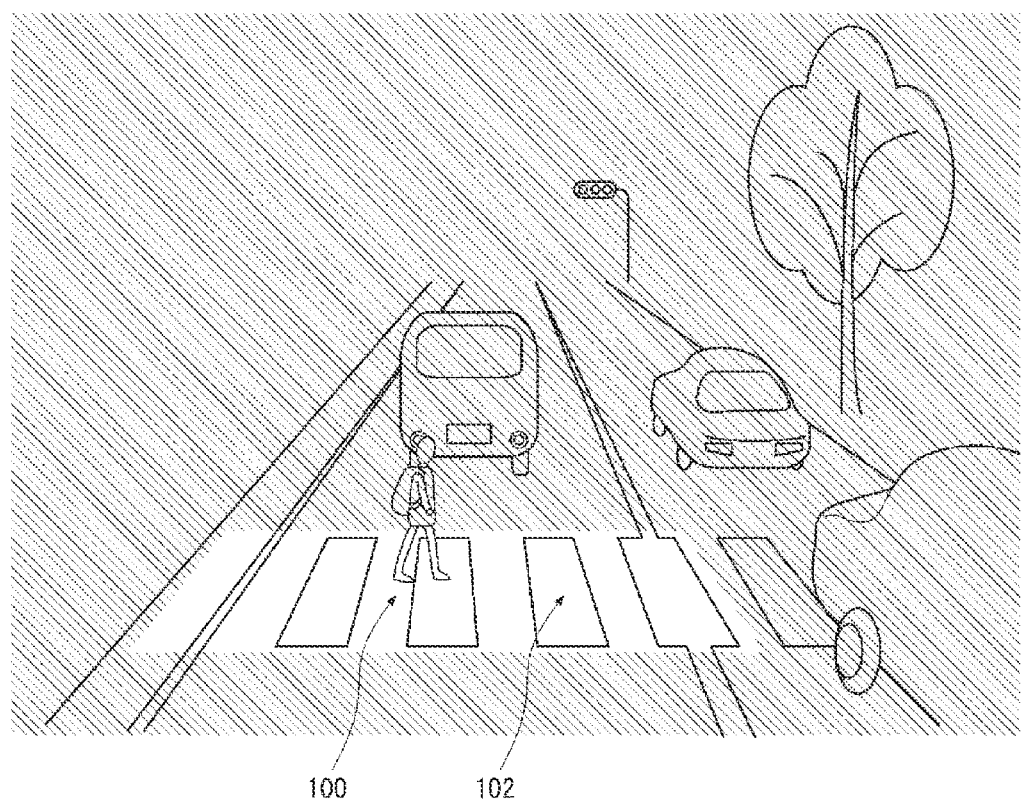
FIG. 12 is a diagram showing a state in which the figure rendering forming optical unit emits light to a predetermined area (an entire rectangular area having a dimension corresponding to a dimension of a pedestrian crossing) including a pedestrian who crosses a road according to a third embodiment.

When a position of a pedestrian or the like who is crossing a road or is about to cross a road is on a pedestrian crossing or in the vicinity of a pedestrian crossing, an area having a width and a length corresponding to the detected pedestrian crossing may be determined as a "crossing prediction area" (see FIG. 12). The pedestrian crossing (white) rendered on a traveling road surface appears to float when irradiated with light, and has good visibility for a driver of the own vehicle or an oncoming vehicle. When a pedestrian or the like on a pedestrian crossing is detected, it is desirable to determine the entire pedestrian crossing including the pedestrian or the like as a "crossing prediction area".

When the detected pedestrian crossing is determined as a "crossing prediction area" of a pedestrian or the like, for example, the control device 56 may set a rectangular area having a predetermined width and a length corresponding to ⅓ of a width of a road as a "crossing prediction area", and may determine to gradually increase a length of the "crossing prediction area" in accordance with time or a movement of the pedestrian or the like (see FIGS. 13A to 13C).

Then, the control device 56 determines a rendering figure such as a mark or a character for calling attention of a driver of the own vehicle or another vehicle, a pedestrian 100, or the like according to a necessity determined based on the above analysis, and transmits a control signal to the rendering emitting control unit 53. Accordingly, the figure rendering forming optical unit DMD-R emits light to a predetermined area including feet of a pedestrian or the like so as to call attention of the pedestrian or the like.

Then, the control device 56 transmits information related to the determined "crossing prediction area" serving as a control signal to the rendering emitting control unit 53, and the figure rendering forming optical unit DMD-R emits light to a predetermined area including a pedestrian in accordance with the "crossing prediction area" (see FIGS. 10 to 13C).

Flow Chart

Figure 9:
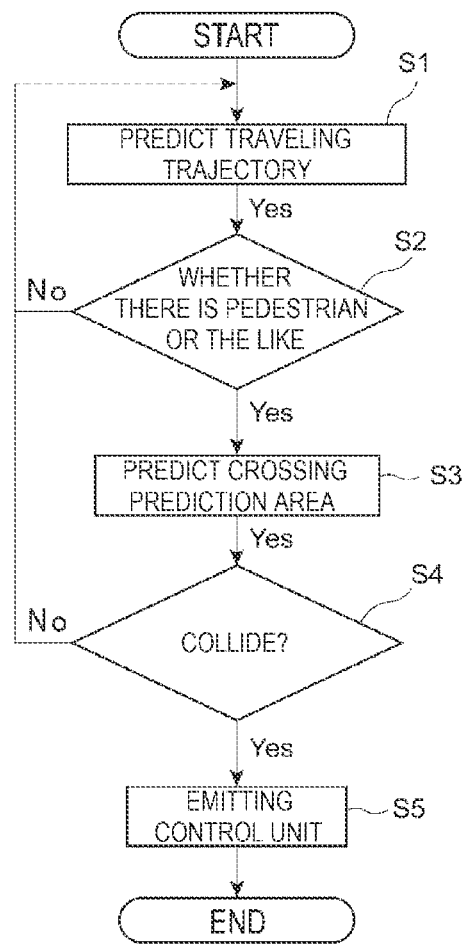
FIG. 9 is a flow chart showing an operation of the control device (including an emitting control unit of the figure rendering forming optical unit) of the vehicle head lamps.

FIG. 9 is a flow chart showing an operation of the control device 56 (including the emitting control unit 53 of the figure rendering forming optical unit DMD-R) of the vehicle head lamps according to the first embodiment.

First, in step S1, the control device 56 predicts a traveling trajectory of the own vehicle. In step S2, the control device 56 detects whether there is a pedestrian or the like in the traveling trajectory of the own vehicle. When a pedestrian or the like is detected, the control device 56 predicts a crossing prediction area of the pedestrian or the like in step S3. Then, in step S4, the control device 56 determines whether there is a risk of the own vehicle colliding or coming into contact with the pedestrian or the like based on the traveling trajectory of the own vehicle and the crossing prediction area of the pedestrian or the like. When there is a risk of the own vehicle colliding or coming into contact with the pedestrian or the like, in step S5, the control device 56 outputs a control signal to the emitting control unit 53, and the figure rendering forming optical unit DMD-R emits light to a predetermined crossing prediction area (see FIGS. 10 to 13C).

Figure 10:
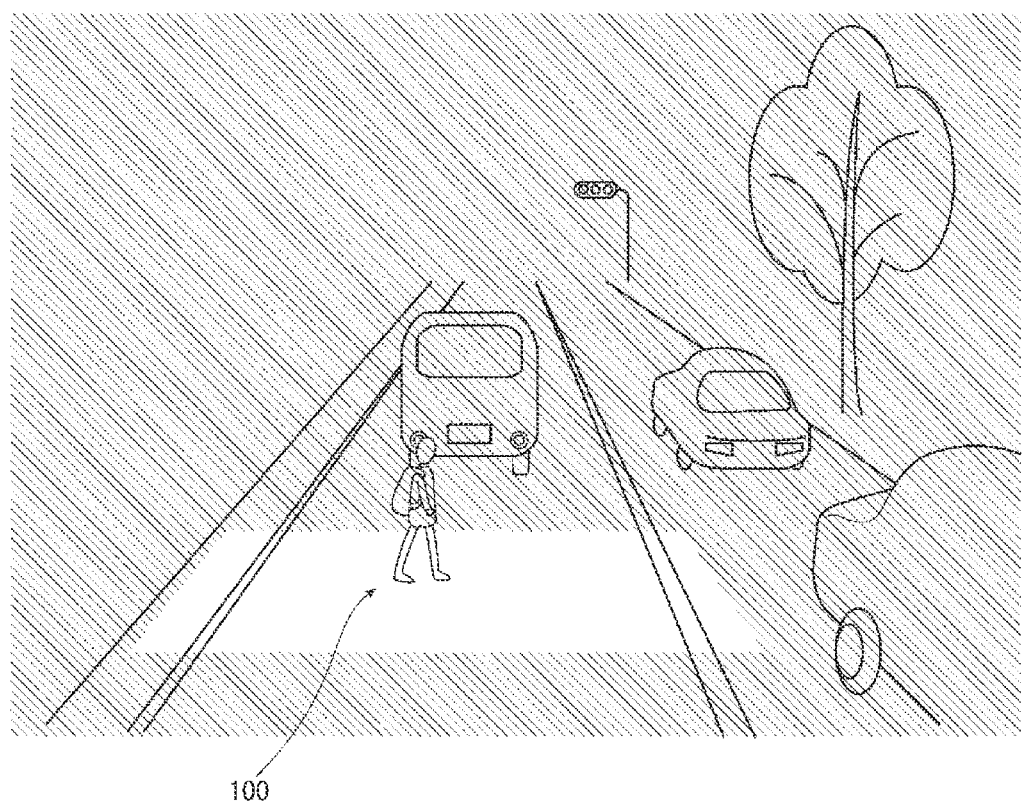
FIG. 10 is a diagram showing a state in which the figure rendering forming optical unit emits light to a predetermined area (an entire rectangular area having a length corresponding to a width of a road) including a pedestrian who crosses a road according to a first embodiment.

FIG. 10 shows an example of a "crossing prediction area" of a pedestrian or the like determined by the control device 56 for the pedestrian 100 who started to cross a road. In FIG. 10, the entire rectangular area having a predetermined width and a length corresponding to a width of the road is illuminated by light emitted from the figure rendering forming optical unit DMD-R.

Figure 11A:
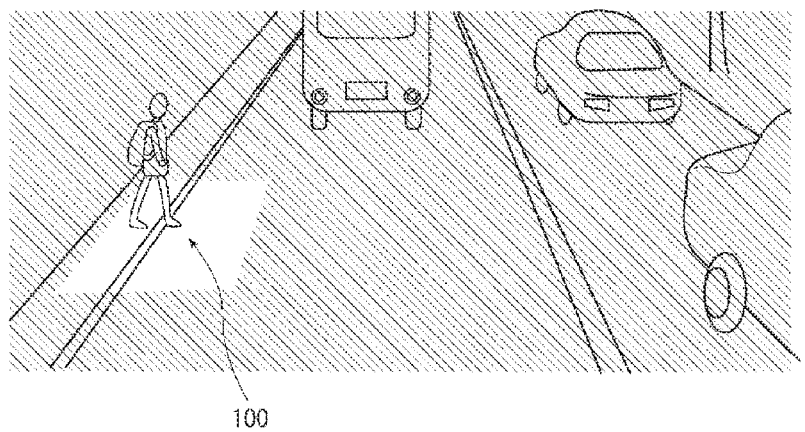
FIG. 11A is a diagram showing a state in which the figure rendering forming optical unit emits light to a predetermined area (an entire rectangular area having a length corresponding to a width of a road) including a pedestrian who crosses a road according to a second embodiment.
Figure 11B:
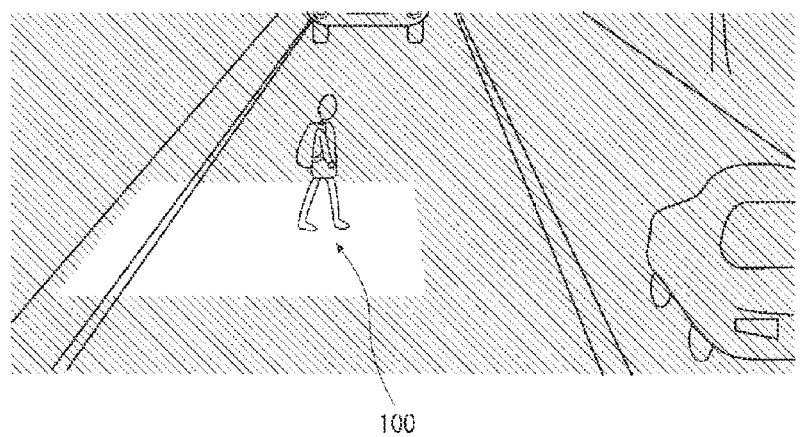
FIG. 11B is a diagram showing a state in which the figure rendering forming optical unit emits light to a predetermined area (an entire rectangular area having a length corresponding to a width of a road) including a pedestrian who crosses a road according to the second embodiment, and an emitted area is expanded in a moving direction of the pedestrian from the state shown in FIG. 11A.
Figure 11C:
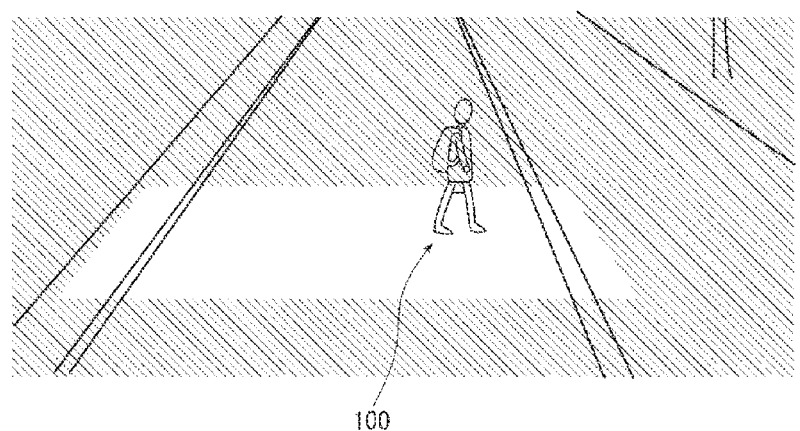
FIG. 11C is a diagram showing a state in which the figure rendering forming optical unit emits light to a predetermined area (an entire rectangular area having a length corresponding to a width of a road) including a pedestrian who crosses a road according to the second embodiment, and an emitted area is expanded in a moving direction of the pedestrian from the state shown in FIG. 11B.

FIGS. 11A, 11B, and 11C show another example of a "crossing prediction area" of a pedestrian or the like determined by the control device 56 for the pedestrian 100 who started to cross a road. FIGS. 11A to 11C show a state (emitting state) in which a rectangular emitted area having a relatively small length in the beginning is gradually increased in a road crossing direction in accordance with a moving speed of the pedestrian 100. In FIG. 11C, the entire rectangular area having a predetermined width and a length corresponding to a width of the road is illuminated by light emitted from the figure rendering forming optical unit DMD-R.

FIG. 12 shows an example of a "crossing prediction area" of a pedestrian or the like determined by the control device 56 for the pedestrian 100 who started to cross a road along a pedestrian crossing 102. In FIG. 12, the entire rectangular area having a dimension corresponding to a dimension of the pedestrian crossing 102 is illuminated by light emitted from the figure rendering forming optical unit DMD-R.

FIGS. 13A, 13B, and 13C show another example of a "crossing prediction area" of a pedestrian or the like determined by the control device 56 for the pedestrian 100 who started to cross a road along the pedestrian crossing 102. FIGS. 13A to 13C show a state (emitting state) in which a rectangular emitted area having a relatively small length in the beginning is gradually increased in a road crossing direction in accordance with a moving speed of the pedestrian 100. In FIG. 13C, the entire rectangular area having a dimension corresponding to a dimension of the pedestrian crossing 102 is illuminated by light emitted from the figure rendering forming optical unit DMD-R.

As described above, in the present embodiment, the low beam forming optical unit Lo-R and the figure rendering forming optical unit DMD-R in the housing of the right head lamp 1R and the low beam forming optical unit Lo-L and the high beam forming optical unit DMD-L in the housing of the left head lamp 1L are provided to be bilaterally symmetrical as viewed from a front side the vehicle C. The optical units Lo-R and Lo-L have the same structure. The figure rendering forming optical unit DMD-R and the high beam forming optical unit DMD-L have the same structure.

Accordingly, when the head lamps 1R and 1L are not turned on, visibility of the head lamps 1R and 1L is bilaterally symmetrical as viewed from a front side of the vehicle and a good appearance is ensured.

On the other hand, when a high beam is formed, the optical units Lo-L and DMD-L are turned on in the left head lamp 1L, and the optical unit Lo-R is turned on in the right head lamp 1R. The DMD-R is turned on as needed (When rendering onto a road surface).

Therefore, when the head lamps 1R and 1L are not turned on, visibility of the head lamps 1R and 1L is not bilaterally symmetrical as viewed from a front side of the vehicle C. However, since the low beam forming optical units Lo-R and Lo-L are always turned on, feeling of strangeness is little.

Although embodiments of the present disclosure have been described above, it is needless to say that the technical scope of the present disclosure should not be limitedly interpreted by the description of the embodiments. It is to be understood by those skilled in the art that the present embodiments are merely examples and various modifications may be made within the scope of the invention described in the claims. The technical scope of the present disclosure should be determined based on the scope of the invention described in claims and an equivalent scope thereof.

Although the light deflection device 24 implemented by the DMD is adopted as a device for forming a light distribution pattern of the figure rendering forming optical unit DMD-R the embodiment described above, the present disclosure is not limited thereto. A device for forming a light distribution pattern of the figure rendering forming optical unit DMD-R may have another configuration as long as the device can form any light distribution pattern at any luminous intensity. For example, a pixel optical device such as an LED array or a liquid crystal shutter, a scanning device that scans a road surface with light from a light source at high speed to form an image by an afterimage effect, and the like may be adopted.

Although vehicle head lamps are described as an example of an illuminating lamp for a vehicle according to the present disclosure in the embodiment described above, the present disclosure is not limited thereto. It is needless to say that the present disclosure can be applied to an illuminating lamp for a vehicle other than a head lamp, such as a fog lamp in which the figure rendering forming optical unit DMD-R is integrally housed in a housing of the fog lamp integrally formed on a bumper.

Although the control device 56 predicts a traveling trajectory of the own vehicle and detects a low speed moving body that is crossing a road or is about to cross a road in the predicted traveling trajectory of the own vehicle in the embodiment described above, the present disclosure is not limited thereto. For example, a vehicle control unit that controls traveling of a vehicle may predict a traveling trajectory of the own vehicle and detect a low speed moving body that is crossing a road or is about to cross a road in the predicted traveling trajectory of the own vehicle. Then, the control device 56 may acquire, from the vehicle control unit, detection information indicating detection of the low speed moving body that is crossing a road or is about to cross a road in the predicted traveling trajectory of the vehicle, set a crossing prediction area based on the acquired detection information, and control the figure rendering forming optical unit DMD-R (an example of a second emitting unit) to emit light to the crossing prediction area.

Although an example in which one pedestrian crosses a road is described in the embodiment described above, the present disclosure is not limited thereto. For example, when a plurality of pedestrians cross a road, a crossing prediction area having a width covering all of the pedestrians may be determined. Accordingly, all of the plurality of pedestrians or the like can accurately know the presence of an approaching vehicle and can know a condition of the road surface to be crossed.

This application is based on Japanese Patent Application No. 2018-185880 filed on Sep. 28, 2018, the contents of which are incorporated herein by reference.

The invention claimed is:

1. An illuminating lamp for a vehicle comprising:
a first emitting unit configured to form a predetermined light distribution;
a second emitting unit configured to emit predetermined light to a road surface ahead of the vehicle; and
a control device configured to control the second emitting unit to emit light to a crossing prediction area that includes a low speed moving body crossing or about to cross a road in a predicted traveling trajectory of the vehicle and that extends in a road crossing direction of the low speed moving body based on detection information indicating that the low speed moving body is detected,
wherein the first emitting unit and the second emitting unit are housed in a housing including a lamp body having an opening at a front side of the vehicle and a cover attached to the opening of the lamp body, and
wherein the control device is configured to adjust a width of the crossing prediction area corresponding to a width of the low speed moving body.

2. The illuminating lamp for a vehicle according to claim 1,
wherein the control device is configured to gradually increase the crossing prediction area to a front side in the road crossing direction based on a moving speed or a predicted moving speed of the low speed moving body in the road crossing direction.

3. The illuminating lamp for a vehicle according to claim 1,
wherein the first emitting unit is a low beam forming optical unit, and
wherein the second emitting unit is a figure rendering forming optical unit including a DMD device.

4. The illuminating lamp for a vehicle according to claim 1, wherein the control device controls the second emitting unit to emit light to the crossing prediction area only when there is a risk of the own vehicle colliding or coming into contact with the low speed moving body.

5. The illuminating lamp for a vehicle according to claim 1,
wherein the low speed moving body comprises a plurality of low speed moving bodies,
wherein the control device is configured to adjust the width of the crossing prediction area to correspond to the width of the plurality of low speed moving bodies, and
wherein the control device controls the second emitting unit to emit light in order to brightly illuminate the plurality of low speed moving bodies.

6. An illuminating lamp for a vehicle comprising:
a first emitting unit configured to form a predetermined light distribution;
a second emitting unit configured to emit predetermined light to a road surface ahead of the vehicle; and
a control device configured to control the second emitting unit to emit light to a crossing prediction area that includes a low speed moving body crossing or about to cross a road in a predicted traveling trajectory of the vehicle and that extends in a road crossing direction of the low speed moving body based on detection information indicating that the low speed moving body is detected,
wherein the first emitting unit and the second emitting unit are housed in a housing including a lamp body having an opening at a front side of the vehicle and a cover attached to the opening of the lamp body, and
wherein the control device is configured to gradually increase the crossing prediction area to a front side in the road crossing direction based on a moving speed or a predicted moving speed of the low speed moving body in the road crossing direction.

* * * * *